April 14, 1936.  W. J. GREENLEAF  2,037,466

REAMER

Filed Jan. 20, 1934

INVENTOR
Walter J. Greenleaf

Patented Apr. 14, 1936

2,037,466

UNITED STATES PATENT OFFICE 2,037,466

REAMER

Walter J. Greenleaf, Meadville, Pa.

Application January 20, 1934, Serial No. 708,192

3 Claims. (Cl. 77—75)

This invention relates to improvements in reamers and one of its objects is to provide means for holding the cutter blades, to permit of accurate adjustment radially and longitudinally, and to positively lock the cutter blades in their adjusted positions.

Another object of the invention is the provision of a reamer with a cutter blade receiving slot, and a two piece reamer or cutter blade, the parts of which are designed for relative interlocking adjustment, to permit of radial and longitudinal adjustment of the blade in the reamer, and which can be fitted in the slot and positively locked to the body of the reamer, by means of a key pin disposed in angular relation to the bottom or inner edge of the cutter blade.

A further object of the invention is the provision of a machine tool having a slotted body of a cutter fitting in the slot of the body, and consisting of a main part having a ground cutter edge and a minor part of wedge shape, which is constructed to have interlocking engagement with the edge carrying part, and adapted to be driven in the slot against an inclined key pin, so that the two piece cutter blade can be effectively locked in place, and radial and longitudinal adjustment of the cutter edge, relative to the body, readily obtained.

A still further object of the invention is to provide interlocking teeth between the parts of the cutter blade, with which precision adjustment of the radial position of the cutter edge may be readily obtained.

With the above and other objects in view the invention consists in certain new and useful constructions, combinations, and arrangements of parts, clearly described in the following specification, and fully illustrated in the accompanying drawing:

Figure 1:
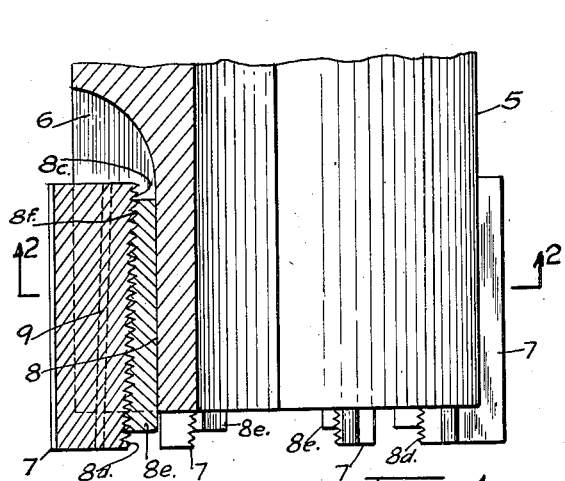
Fig. 1 is a side view of the improved reamer, shown partly in longitudinal section.
Figure 3:
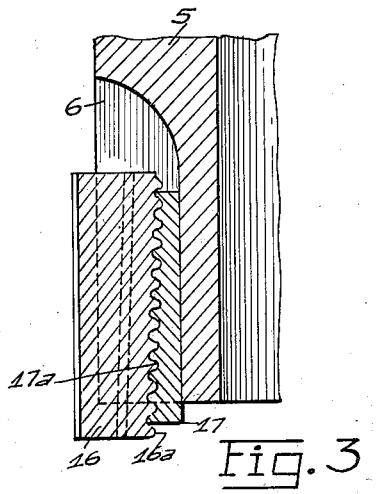
Fig. 3 is a detail view in longitudinal section, shown on an enlarged scale.
Figure 2:
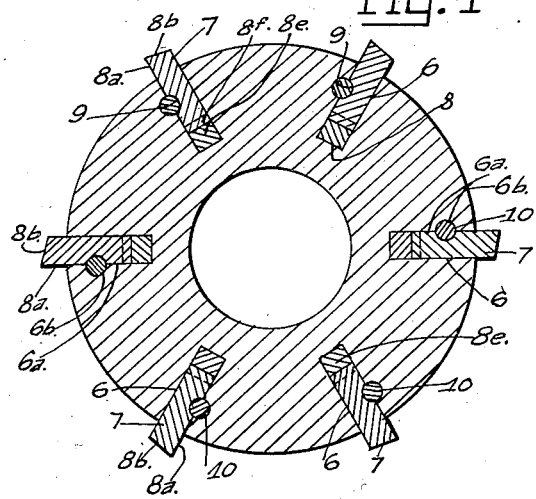
Fig. 2 is an end view thereof.
Figure 4:
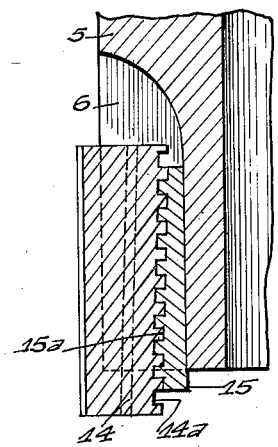
Fig. 4 is a detail cross sectional view, on an enlarged scale.

Referring to the accompanying drawing which illustrates the practical construction of my invention, 5 designates the body of the reamer or machine tool, which is shown to be cylindrical, and which may be tubular or otherwise, according to the requirements of the machinist.

The body is formed with a series of parallel longitudinal slots 6, which are shown in spaced relation, and in which the cutter blades 7 are disposed.

The bottom walls 8 of the slots are disposed parallel to the outer surface of the body, and the side faces of each blade are disposed parallel to each other. Each blade consists of the cutter section 8a, which is formed with a bevelled cutting edge 8b on the outer longitudinal portion thereof, and further formed with an inclined inner edge 8c, having a series of V-shaped teeth 8d thereon, the tips of which are disposed in a plane parallel to the key holding slot 9 formed in one side of the blade section 8a. The blade section 8a is engaged by the second blade or wedge section 8e, which is formed with a series of V-shaped teeth 8f, disposed on an incline and designed to cooperate with the teeth 8d of the cutter section 8a. The inner edge of the wedge section 8f is parallel to the outer cutting edge of the blade.

One wall 6a of each slot is formed with an inclined pin groove 6b, designated to receive the key pin 10, which is designed to also engage the pin groove or slot 9 of the blade section 8a, and to prevent displacement of the two piece blade from the body of the reamer or tool.

The cooperating slots or grooves 6b and 9 are tapered, relative to the body 5, to parallel each other and to parallel the interlocking toothed edges of the cutter section 8a and the wedge section 8f, of the blade.

The teeth of the inclined edges of the two blade sections are preferably made small, and are spaced apart equally, so that the radial advance which each tooth represents will be approximately 30 thousandths of an inch, or some other predetermined unit of precision measurement.

By interlocking the wedge section 8f in various positions of longitudinal adjustment, the radial projection of the cutter edge of each blade may be accurately varied. The blade is positively locked in the selected adjustment by driving the two piece blade in the slot of the body, against the inclined holding pin thereof. This adjustment also permits of the blade being adjusted so that one end thereof will project endwise of the body, whereby all of the blades may be locked in precision adjustment so as to cut or ream forwardly of the body.

Figure 5:
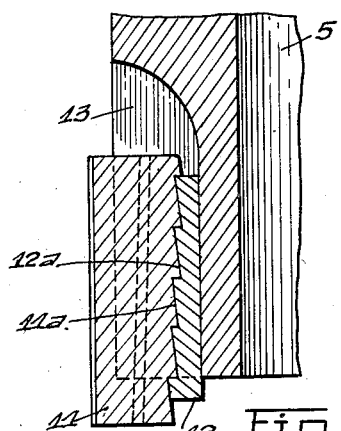
Fig. 5 is a side elevation of a modified form of the cutter blade.

In Fig. 5 I show a two piece cutter blade, consisting of the cutter section 11 and the wedge section 12. The cutter section 11 is formed with a series of approximately ratchet shaped teeth 11a, which interlock with the teeth 12a of the wedge section 12. In this assembly the wedge, when locked in the slot 13 of the body, may be driven out of the slot.

I claim as new:—

1. A reamer having a rotatable body formed with a slot disposed longitudinally thereof and opening on the outside of the body, the bottom wall of said slot being located in axial relation to the body and the side walls of the slot being parallel to each other, a two piece cutter inserted in the slot, said cutter including a cutter blade and an adjustment section, the cutter blade having parallel side faces snugly engaging the parallel side walls of the slot and a cutting edge adapted to extend outwardly of the body, the inner edge of the cutter blade being inclined relative to the axis of the body and provided with a row of teeth, the adjustment section having parallel side faces to engage the side walls of the slot and having an inner edge adapted to engage the bottom wall of the slot, said inner edge being disposed in axial relation to the body, the outer edge of the blade adjustment section being formed with teeth corresponding to the teeth of the cutter blade section and adapted to interlock therewith and said last-named teeth being disposed in approximately the same incline as the inclination of the inner edge of the cutter blade, the body having a groove in one of said side walls extending in approximate parallel relation to the inclined inner edge of said cutter blade, and a pin driven into said groove, the cutter blade having a corresponding inclined groove to receive one side of the pin, whereby the cutter may be assembled in proper adjusted relation outside of the slot and then driven into the slot to secure the same in rigid relation to the body in the adjusted relation.

2. A reamer consisting of a body formed with a plurality of slots opening through the external surface thereof and each providing parallel side walls, a cutter having parallel side faces disposed in each slot, the outer longitudinal edge of the cutter having a cutting edge projecting outwardly of the body and the inner longitudinal edge of the cutter having interlocking means thereon, said cutter having a separable section having interlocking means cooperating with the interlocking means of the cutter first-named, the inner wall of the slot being parallel to the outer surface of the body but the medial line through the cooperating interlocking means being disposed at an inclination to the wall of the slot, the cutter having an inclined side key slot and one of the side walls of each slot of the body having a corresponding key slot, and a key pin engaging both key slots, whereby the sectional cutter may be adjusted out of the slot and together with the key pin driven in its adjusted position into the slot to wedge the same therein.

3. A reamer having a body adapted to be rotated relative to the work to be reamed and provided with a series of longitudinal slots, each slot having parallel side walls and an inner bottom wall which is parallel to the outer surface of the body, a sectional cutter inserted in each slot, each cutter consisting of an outer section formed with a cutter edge and an inner separable section formed with a surface to engage the bottom wall of the slot, the meeting surfaces of the two sections of each cutter being inclined relative to the bottom wall, said meeting surfaces being formed with interlocking means, whereby the sections of the cutter may be adjusted relative to each other by being longitudinally shifted out of the slot and then driven into the slot, and means having inclined interlocking engagement with the cutter and the bory for wedging each cutter in its slot in its adjusted position.

WALTER J. GREENLEAF.